United States Patent [19]

Penrod

[11] 4,025,820

[45] May 24, 1977

[54] CONTACTOR DEVICE INCLUDING ARC SUPRESSION MEANS

[75] Inventor: John K. Penrod, Bellbrook, Ohio

[73] Assignee: Power Management Corporation, Dayton, Ohio

[22] Filed: Mar. 11, 1976

[21] Appl. No.: 666,152

[52] U.S. Cl. .................................. 361/8; 361/13
[51] Int. Cl.$^2$ ........................................ H02H 7/22
[58] Field of Search ............ 317/11 E, 11 A, 11 R, 317/335 C, 40 A; 307/136

[56] References Cited

UNITED STATES PATENTS

| | | | |
|---|---|---|---|
| 3,401,303 | 9/1968 | Walker | 317/11 E |
| 3,558,910 | 1/1971 | Dale et al. | 317/11 E X |
| 3,786,337 | 1/1974 | Kugler | 317/11 E X |

OTHER PUBLICATIONS

"Commutated Relay Combines Solid–State Switching", von Brimer Thirteenth Annual National Relay Conference, Apr. 1965.

*Primary Examiner*—Harry Moose
*Attorney, Agent, or Firm*—Biebel, French & Nauman

[57] ABSTRACT

An electrical contactor device includes a solid state arc suppression circuit connected in parallel with main relay contacts. Auxiliary contacts provide gating signals to the arc suppression circuit prior to, during and shortly after the main contacts open. Protection contacts connected in series with the arc suppression circuit are part of a relay which is actuated by additional auxiliary contacts of the main relay. The protection contacts prevent the arc suppression circuit from operating during initial closure of the main contacts thereby allowing the contactor device to be used in those applications where a high in-rush current is expected. A delay circuit holds the protection circuit relay contacts closed after the main relay contacts open to permit operation of the arc suppression circuit; the relay contacts thereafter open to isolate the arc suppression circuit and thereby to prevent any leakage current from flowing therethrough and to prevent any false triggering thereof. A fuse in the protection circuit prevents operation of the contactor device in the event the solid state devices become short circuited.

8 Claims, 8 Drawing Figures

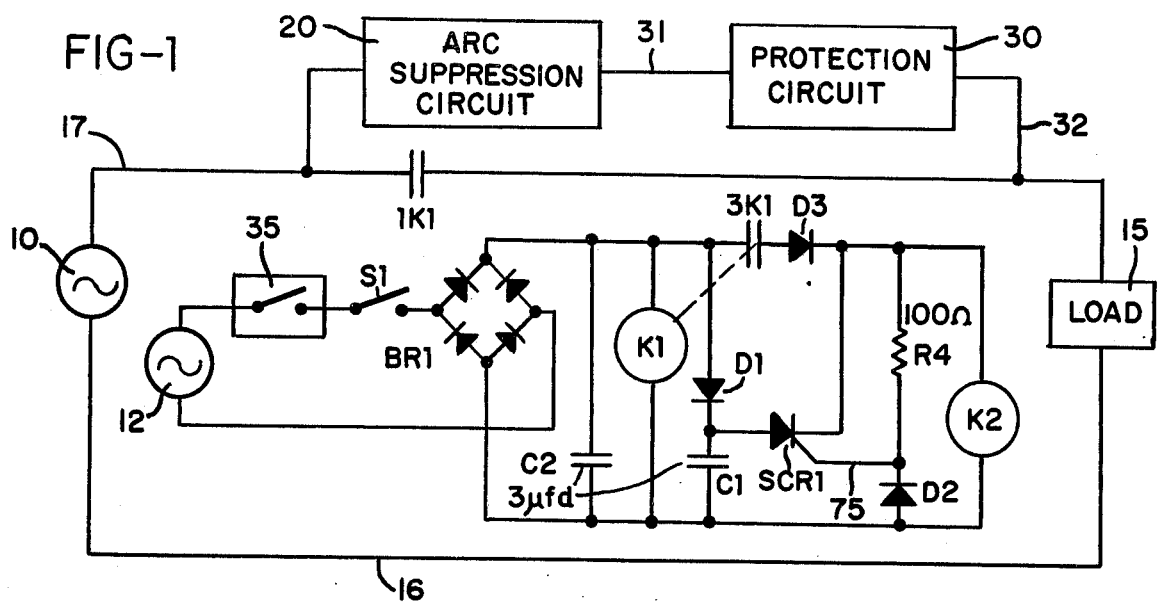

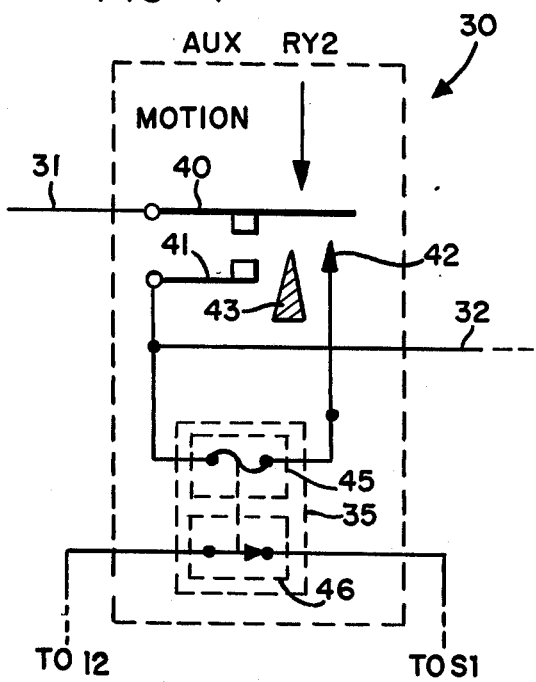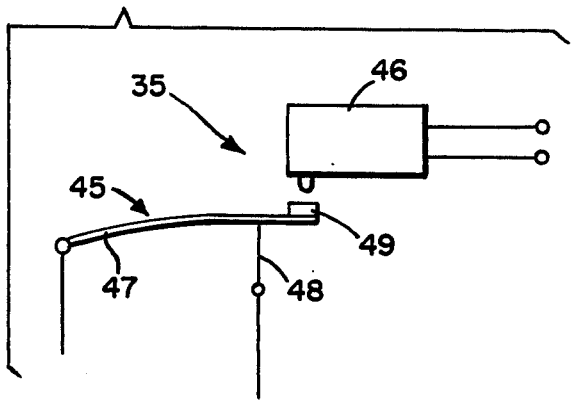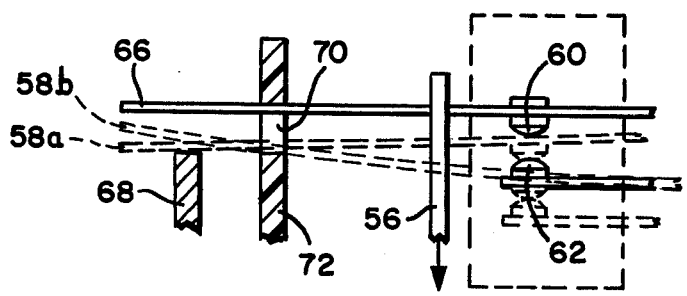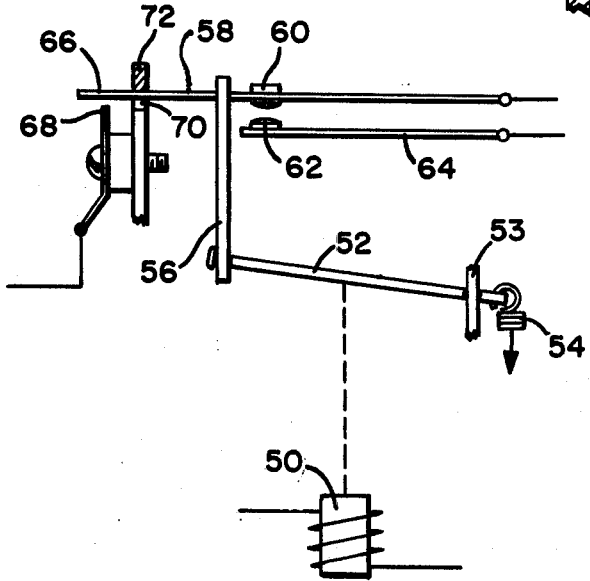

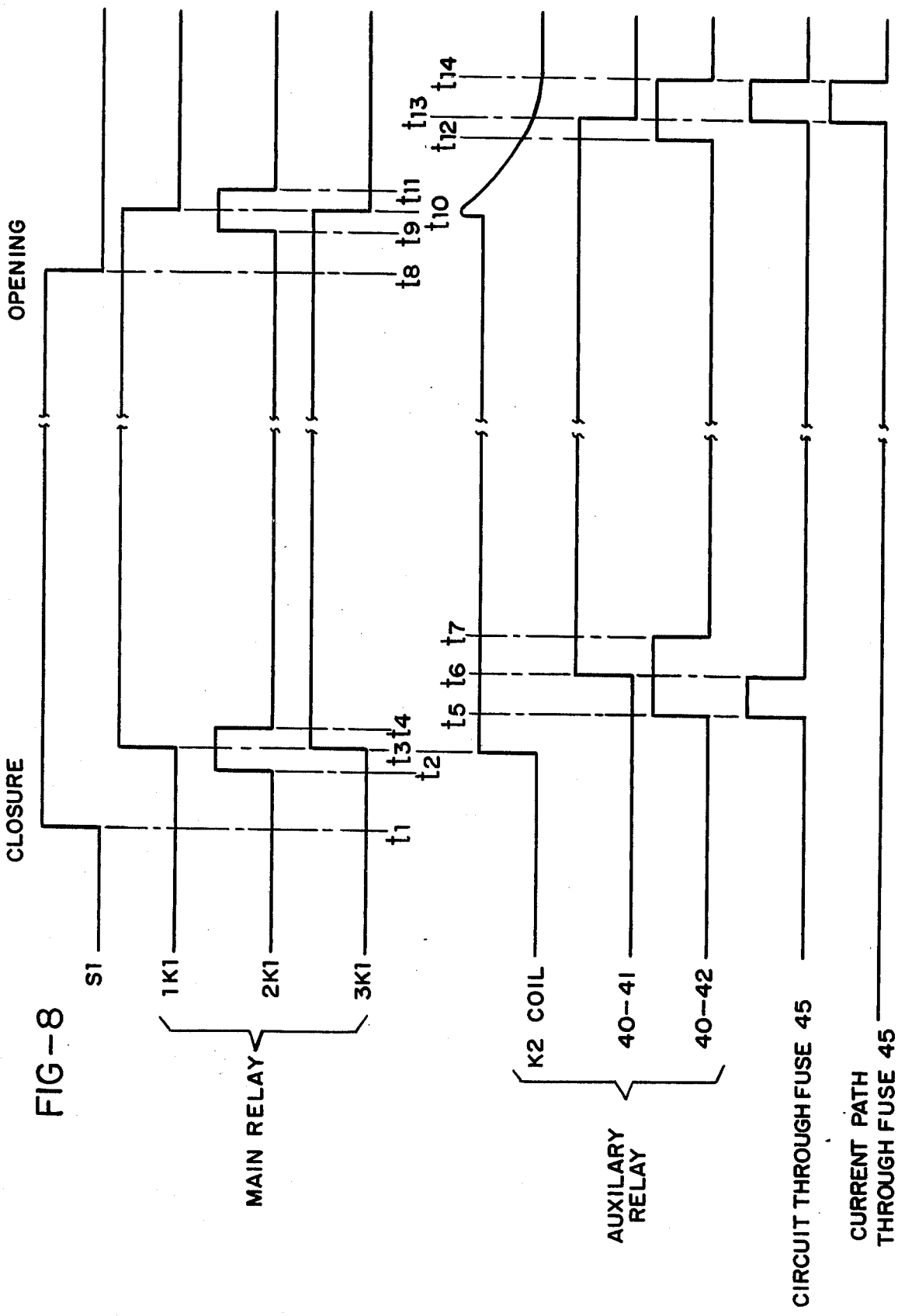

CONTACTOR DEVICE INCLUDING ARC SUPRESSION MEANS

BACKGROUND OF THE INVENTION

This invention relates to electrical contactor devices for controlling the application of electrical current to a load.

Semiconductor devices have been used in parallel with electrical contacts to reduce or suppress arcing during contact closure and opening, as shown in U.S. Pat. Nos. 3,474,293; 3,543,047; 3,555,353; 3,558,910; 3,639,805; and 3,868,549, and an article entitled "Commutating Relay Combined Solid State Switching" by J. S. von Brimer, April 1965, 13the Annual National Relay Conference.

In many of these prior art devices, the semiconductor devices are connected in parrallel with the contactor elements, and any leakage current through the semiconductor device would be felt at the output terminals of the contactor. Also, it is possible that transient voltages might trigger the semiconductor devices to the conducting state inadvertently and the load would thereby be connected to the source through the semiconductor although the contacts were not closed. This condition is not only undesirable since this could permanently damage the semiconductor, but it might also be dangerous, especially if maintenance personnel were in physical contact with the output of the contactor.

Electrical contactors manufactured to NEMA specifications are required to handle voltages up to 600 volts RMS, yet mass produced semiconductor devices, such as triacs and silicon controlled rectifiers, generally have a maximum voltage rating in the order of 500 volts. While some semiconductors having a higher voltage rating are available, they can only be obtained at a significant increase in cost.

SUMMARY OF THE INVENTION

This invention relates to electrical contactors for controlling the application of electrical current from an alternating current source to a load. More specifically, this invention relates to mechanically or electromechanically actuated electrical contacts, such as a relay, for carrying current to a load on a continuous basis when closed, means to protect the electrical contacts from damage due to arcing, and means for isolating completely the load from a source of current when the contacts are open.

An arc suppression circuit, including a pair of series connected triacs, is connected in parallel with main relay contacts. Each triac has a voltage rating in the order of 500 volts thus allowing the relay to be operated well within NEMA specifications. A unique circuit is provided to provide gating signals to the series connected triacs without requiring isolated power supplies.

Auxiliary contacts are associated with the main relay contacts and close immediately prior to the closure of the main relay contacts, and open after the main contacts have closed. Similarly, the auxiliary contacts will close immediately prior to the opening of the main relay contacts and will open again after the main contacts have opened.

In one embodiment, gating current to the series connected triacs is provided by a third triac having its main elements connected to the gate electrodes of the triac and its gate electrode connected to and controlled by the auxiliary contacts. In another embodiment, a pair of auxiliary contacts are employed to control the gate current to the series connected triacs.

In some applications of the invention, it has been found that arc suppression is neither needed nor, in some cases, desirable during closure of the main contacts. For example, it has been found that some arcing during contactor closure allows fretting to occur so that the main contacts may carry the full load continuously without excessive contact heating. Also, in some applications, where there is likely to be a high in-rush current, it would not be desirable to use semiconductor devices which might not be able to carry the high initial load, even momentarily. Accordingly, this invention includes circuit means for preventing the operation of the semiconductor are suppression circuit during main contact closure.

The present invention includes means to inhibit the operation of the contactor in the event that the triacs become short circuited and are thus incapable of functioning in a normal manner. Also included is a circuit for isolating completely the load from the source when the main contacts are open. This prevents any false triggering of the arc suppression circuit by any cause, such as transients, and prevents any leakage current through the triacs from being applied to the load.

Any leakage current passing through the contactor device, while it may not be sufficient under normal circumstances to cause direct harm to a person, might be of sufficient magnitude to cause a person to experience an involuntary muscular reaction in response thereto, or since this device may be connected to high voltage, high current power sources, a person might voluntarily react to any sensation of voltage out of an abundance of caution; and in either case, secondary injury might be the result.

The present invention also includes means for disabling the contactor device entirely in the event that the semiconductor arc suppression circuit fails. When semiconductors fail, they usually fail in the short circuit mode; that is, they will pass a high level of current even though no gating signal is present. A fuse element is employed which is connected in series with the arc suppression circuit momentarily after the gating current thereto has been removed. If current in excess of the fuse rating is flowing, it will open, disable the main relay and require replacement of the defective components.

Accordingly, it is an object of this invention to provide an improved contactor device and method particularly for connecting an alternating current power source to a load wherein a semiconductor arc suppression device is momentarily connected in parallel with the main contacts of the relay prior to and after contact opening to provide a low impedance current path therearound to suppress arcing and which further includes a protection circuit for preventing the operation of the semiconductor arc suppression circuit during initial contact closure and for providing an open circuit after the main contacts have opened to isolate completely the source of current from being applied to the load and to prevent the arc suppression circuit from being gated on by transient pulses.

Other objects and advantages of the invention will be apparent from the following description, the accompanying drawings and the appended claims.

BRIEF DESCRIPTION OF THE DRAWINGS

FIG. 1 is an electrical diagram showing the various elements which comprise the present invention;

FIG. 2 is an electrical schematic diagram of one embodiment of an arc suppressing circuit constructed according to the present invention;

FIG. 3 is an electrical schematic diagram of another embodiment of an arc suppressing circuit;

FIG. 4 is an electrical schematic diagram of the protection circuit;

FIG. 5 is a schematic diagram showing a fusing circuit;

FIG. 6 is a schematic representation of a relay having auxiliary contacts of the type used in the present invention;

FIG. 7 is a detail of the main and auxiliary relay contacts and shows the operation thereof; and FIG. 8 is a timing chart showing the operation of the various contacts of both the main and auxiliary relays.

DESCRIPTION OF THE PREFERRED EMBODIMENTS

Referring now to the drawings, and particularly the block diagram of FIG. 1, an alternating current power supply 10 is connected to a load 15 by conductor 16 and through normally open contacts 1K1 of main relay K1 by conductors 17 and 18. Relay K1 may be controlled by means of a switch S1 or some other appropriate control means. Also shown in FIG. 1 is an auxiliary relay K2, the purpose and function of which will be described later.

As shown in FIG. 1, a second power source 12 may be used to supply current to the relays K1 and K2. It should be understood that this power source may be an independent alternating current or direct current supply or current may be provided directly from the power supply 10, depending upon the voltage of that power supply and the particular environment in which the device is to be used.

Connected in parallel with the main relay contacts 1K1 are an arc suppression circuit 20 and a protection circuit 30. The arc suppression circuit 20 includes solid state devices which prevent or suppress arcing between the contacts 1K1 of relay K1 and thus significantly prolong their useful life. The protection circuit 30 accomplishes three purposes: the first is to prevent any leakage current which might otherwise pass through the arc suppression circuit from being applied to the load; the second is to prevent further operation of the device in the event the arc suppression circuit fails; and the third is to prevent false turn-on of the arc suppression circuit due to line transients. The protection circuit 30 is connected to a fuse controlled switch 35 which is in series with relay K1.

Referring now to FIG. 2, the arc suppression circuit 20 includes a pair of series connected triacs T1 and T2 connected in parallel through the protection circuit 30 with the main relay contacts 1K1. By using series connected triacs, it is possible to significantly increase the voltage capacity of the relay circuit. Connected in parallel with the triacs are load balancing resistors R1 and R2. These resistors are of high ohmic value, in the order of one megohm, and therefore the current through these resistors is limited to no more than 1 milliamp.

Triacs T1 and T2 are controlled by a third triac T3 which has its main terminals connected to the gate electrodes of triacs T1 and T2; and the gate electrode of triac T3 is connected through resistor R2 and through the auxiliary contacts 2K1 of main relay K1.

The auxiliary contacts 2K1, described in my copending now U.S. Pat. No. 3,982,137, issued Sept. 21, 1976, close prior to the opening or closing of the main relay contacts 1K1. Thus, whenever contacts 2K1 are close, triac T3 will be provided with gate current and that device will in turn supply gate current to triacs T1 and T2 which may provide a current path around the main relay contacts 1K1. When contacts 2K1 are opened, gate current will be removed from triac T3, and thus triacs T1 and T2, and all of those solid state devices will commutate off at the next zero crossing of the current on line 17.

FIG. 3 is an alternative embodiment of the arc suppression circuit and also includes two series connected triacs T1 and T2 in parallel with the main contacts 1K1. In this embodiment, the gate electrodes of these triacs are connected through resistors R4 and R5 to auxiliary relay contacts 4K1 and 5K1. When the relay is energized, contacts 4K1 and 5K1 will close simultaneously but prior to the closure of the main contacts 1K1 and will open after the main contacts have closed. Similarly, during relay deenergization, these auxiliary contacts will close momentarily before main contacts 1K1 open and will remain closed until after the main contacts have opened. The operation of these contacts is described more completely in my copending application Ser. No. 562,809, filed Mar. 27, 1975, and particularly the description relating to FIGS. 7 and 8.

In the embodiments shown in both FIGS. 2 and 3, the series connected triacs T1 and T2 permit the relay contacts 1K1 to be used to control the application of voltages in the order of 600 volts to a load even though each triac has a lower voltage rating. The gate electrodes of the triacs are provided with gating current through a third triac, as shown in FIG. 2, or through a pair of auxiliary switch contacts, as shown in FIG. 3; and in either case, the gating signals are provided without the use of isolated power supply means.

Either of the circuits 20 shown in FIGS. 2 or 3 may be connected directly in parallel with the main relay contacts 1K1 by a conductor shown by the dashed line 33. It is preferable, however, that the arc suppression circuit 20 be connected in series with a protection circuit 30, the preferred embodiment of which is shown in FIG. 4. The protection circuit is connected to an arc suppression circuit 20 by conductor 31 and to line 18 by conductor 32. The protection circuit includes an auxiliary relay K2 having main contacts 40 and 41, an auxiliary contact 42, and a fuse controlled switch 35.

The relay K2 is similar in many respects to the main relay K1, and the relay shown in my copending application Ser. No. 562,809 in that the auxiliary contacts 40–42 close prior to the closure of the main contacts 40–41, and after main contact closure, auxiliary contacts 40–42 open due to the action of pivot 43. Similarly, upon relay deenergization, the auxiliary contacts 40–42 close before the main contacts 40–41 open and thereafter open.

FIG. 5 shows the fuse controlled switch 35 including a fuse element 45 and a normally closed switch 46. The fuse element 45 may be a Buss type GMT ¼ amp signal indicating and alarm actuating type fuse which includes a spring arm 47 held in place by a fuse link 48. Current in excess of the rating of the fuse link, in this case 250 milliamps, will cause the fuse link to melt and allow the spring arm 47 to move upwardly and contact the actuating element of the switch 46 to open the circuit therethrough. The end of the arm 47 may be provided with an insulator 49. The normally closed switch used in the preferred embodiment is a Honeywell type 2SX1-T microswitch.

FIG. 6 is a schematic representation showing the operation of a relay having main and auxiliary contacts. The type of relay shown in FIG. 6 may be used both for the main relay K1 and the auxiliary relay K2. The relay is provided with a magnetic coil 50 which, when energized, pulls an armature 52 downwardly. The armature rotates about a pivot 53 and is urged away from the coil by a spring 54. Movement of the armature 52 downwardly causes an insulated linkage member 56 to move downwardly also. Member 56 engages a first or upper contact bar 58 which carries a main contact element 60 positioned directly opposite a second contact element 62 carried by a contact bar 64. Both contact bars 58 and 64 are of sufficient cross sectional area to carry the current to the load 15 on a continuous basis, yet they are flexible enough to bend during operation of the relay.

The contact bar 58 extends through and is attached to the linkage 56 and the end thereof forms a contact 66 which, as shown, is spaced from a second contact 68. The contact bar 58 also passes through an opening 70 in a fixed insulated support member 72. As shown in FIG. 7, the bottom portion 73 of the opening 70 is so positioned with respect to the contact bar 58 that it engages the bar as the relay coil pulls the armature 52 downwardly. As a result, contacts 66 and 68 close momentarily prior to the closure of contacts 60 and 62, as shown by the dashed line 58a; thereafter contacts 60 and 62 engage; and finally, contacts 66 and 68 open, as shown by the dashed lines 58b.

Contacts 60 and 62 are equivalent to contacts 1K1 of relay K1 and to contacts 40-41 of relay K2; and contacts 66 and 68 are equivalent to contacts 2K1 of relay K1 and to contacts 40-42 of relay K2.

Referring again to FIG. 1, the alternating current source is connected through fuse controlled switch 35 and switch S1 to a bridge rectifier circuit BR1, the output of which is connected directly to relay K1 and through diode D1 to a capacitor C1. This capacitor will charge quickly to the peak output voltage of the bridge rectifier. The output of the bridge rectifier is also connected through normally open auxiliary relay contacts 3K1 to the coil of relay K2 which will therefore be energized whenever relay K1 is energized. Auxiliary relay contacts 3K1 are similar to and operate simultaneously with contacts 1K1 although they do not carry the same current load.

Relay K2 is a conventional direct current relay having a voltage rating equal to the output of the bridge rectifier BR1. One of the features of this invention is that relay K2 will remain energized for a short time after the deenergization of relay K1 and thus the openings of contacts 3K1. One prior art technique for accomplishing this delay is to provide a capacitor across the windings of relay K2 which is charged by the power supply and which then discharges into the relay coil when the power supply output is terminated.

However, in order to provide a time delay long enough to insure that the contacts of relay K2 remain closed after deenergization of relay K1, a capacitor connected in parallel with the windings of the relay would have to be of such a large value that it would increase substantially the voltage across the relay coil due to the tendency of a capacitor to charge to the peak output voltage (approximately 1.414 times the RMS output voltage) of the bridge rectifier, thus requiring the relay coil to be designed to accommodate this higher voltage. This is unnecessary in the present invention, however, since capacitor C1 is isolated from the coil of relay K2 through the operation of dioded D1 while contacts 3K1 are closed.

Capacitor C1, however, will charge to the peak output voltage of the bridge rectifier quickly since there is no dropping resistor in series with it; and this higher voltage will result in a longer time delay than would be possible if a capacitor of the same value (3 mfd) were connected continuously in parallel with the relay. Capacitor C2, on the other hand, is connected in parallel with the coil of relay K1, and its capacitance (3 mfd) is not sufficiently large to raise the average voltage on the relay coil significantly.

When relay contacts 3K1 open, however, the magnetic field around the windings of relay K2 begin to collapse and induce current flow through diode D2 and resistor R4. This current is sufficient to generate a voltage on line 75 to gate SCR1 into the conducting state, and thereby connect capacitor C1 directly across the windings of relay K2. Sufficient current will then continue to flow through these windings to hold those relay contacts closed for a time period determined by the capacitance of C1, the resistance of K2 and the tension on the spring biasing the armature against the magnetic field. When the current from capacitor C1 through SCR1 and the winding of relay K2 decreases below the hold-in current of the SCR, it will commutate off, and the circuit will be restored to its original status. The capacitor C1 charges quickly to the peak output voltage of the bridge rectifier, and therefore if the switch S1 were closed only momentarily, there would be a sufficient electrical charge on capacitor C1 to insure that relay K2 deenergizes after relay K1. This circuit therefore insures that relay K2 operates in a proper sequence with respect to relay K1 regardless of the duration of closure of switch S1.

The operation of the invention will now be described be referring to the timing chart of FIG. 8. At time $t1$, switch S1 is closed to supply power through the fuse controlled switch 35 to main relay K1. It is to be understood that switch S1 merely represents any device that may be used to control the application of electrical current from a source 10 to a load 15. Once current is supplied to the coil of relay K1, the relay armature begins to move, relay contacts 2K1 close at time $t2$ followed by the closure of relay contacts 1K1 and 3K1 at time $t3$, and thereafter relay contacts 2K1 open at time $t4$.

Upon the closure of contacts 3K1 at time $t3$, power is supplied to the coil of auxiliary relay K2 through the circuit shown in FIG. 1, and the armature of that relay begins to pull in with contacts 40-42 closing first at time $t5$ followed by the closure of contacts 40-41 at time $t6$, and thereafter contacts 40-42 open at time $t7$.

Since contacts 40-42 close prior to the closure of contacts 40-41, a current path is momentarily created through the fuse link 48 between times $t5$ and $t6$. Although contacts 40-42 remain closed until time $t7$, the current path through the fuse link is short circuited upon the closure of contacts 40-41.

It is noted, however, that no current will flow through the fuse link 48 at this time if the contacts 1K1 are closed and the triacs T1 and T2 actually gate off at time t4 which is prior to the closure of contacts 40–42 at time t5. In the modification shown in FIG. 3, the relay contacts 4K1 and 5K1 operate to supply gating current to the triacs T1 and T2 at the same time as relay contacts 2K1.

Upon the opening of switch S1 at time t8, current is removed from the coil of relay K1, the relay armature begins to fall away and contacts 2K1 then closes at time t9 followed by the opening of relay contacts 1K1 and 3K1 at time t10. Since relay contacts 3K1 provide the current to the coil of relay K2, that relay would normally drop out except for the time delay circuit shown in FIG. 1; however, the decays on the coil of K2 actually rises and thereafter dacays due to the action of capacitor C1.

Contacts 2K1 open at time t11 to remove the gating current to the triacs T1-T3 which thereafter commutate off. When the current through the relay coil K2 decreases to the relay drop out current, its armature will begin to pull away, contacts 40–42 will close at time t12 followed by the opening of contacts 40–41 at time t13, and contacts 40–42 again will open at time t14. Between times t13 and t14, contacts 40–42 provide a current path through the fuse link 48, and should the triacs T1 and T2 be defective, a current path will be created between the source 10 and load 15 of sufficient magnitude to cause link 48 to burn out and thereafter disable the circuit.

The fuse link 48 will open in response to a current in excess of 250 milliamps; however, in the event that the triacs T1 and T2 fail, the current carried through the fuse circuit will be several orders of magnitude greater than that, depending upon the load; and therefore the fuse element will open extremely quickly in the event of an actual failure, well within the time period t13–t14.

Another advantage of this circuit is the open circuit provided through contacts 40–42 which prevents any current from being carried to the load after time t14, thus protecting maintenance personnel from inadvertent minor shocks which are frequently encountered using prior art solid state arc suppression circuits. Thus, not only are the contacts 1K1 open, but the solid state arc suppression circuit is isolated and can carry no leakage current to the load 15. While this leakage current may not be sufficient to cause direct harm to an individual coming in contact with the output of the device, it might cause a muscular reaction resulting in a secondary injury. Also, since the arc suppression circuit is isolated from the load by relay K2, the solid state devices cannot be turned on due to transient pulses.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. A method of disconnecting a load from a source of alternating current which has been supplied thereto through the contacts of a relay comprising the steps of
supplying gating current to a semiconductor arc suppression circuit connected in parallel with said contacts during the opening of said contacts, thereafter sensing the magnitude of the leakage current through said arc suppression circuit and preventing future operation of said relay in the event that the leakage current exceeds a predetermined magnitude, and thereafter opening the circuit between the arc supression circuit and said contacts to isolate completely said source from said load.

2. An electrical contactor for connecting and disconnecting an alternating current power source and a load including
a main relay having main contacts connected between the source of current and the load, first auxiliary contacts which close momentarily prior to and open shortly after the opening and closing of said main contacts, and second auxiliary contacts which open and close substantially simultaneously with said main contacts, solid state arc suppression circuit means responsive to the operation of said first auxiliary contacts and connected in parallel with said main contacts for providing a low impedance current path around said main contacts to suppress arcing, an auxiliary relay having contacts electrically connected in series with said arc suppression circuit means and operable in response to said second auxiliary contacts whereby said arc suppression circuit means is electrically isolated during initial closure of said main contacts, and delay circuit means connected to said auxiliary relay for delaying deenergization thereof to provide a current path through said arc suppression circuit means during the opening of said main relay contacts, the contacts of said auxiliary relay thereafter opening to isolate electrically said arc suppression circuit thereby to prevent inadvertent operation thereof and to prevent any leakage current from flowing therethrough.

3. The contactor of claim 2 wherein said delay circuit means includes
a source of direct current,
a capacitor connected to charge to the output voltage of said direct current source,
switch means connected between said capacitor means and said auxiliary relay and responsive to the opening of said second auxiliary contacts to connect said capacitor in parallel with said auxiliary relay thereby to provide a source of current thereto and delay the deenergization thereof.

4. The contactor of claim 3 wherein said switch means includes
means including a diode and resistor connected across said relay coil for developing a voltage in response to the collapse of the magnetic field associated with said coil, and
a gate controlled thyristor electrically connected between said capacitor and the coil of said auxiliary relay and having its gate connected to said resistor.

5. A switching circuit for disconnecting an electrical source of current to a load including
a main relay having main contacts connected between the source of current and the load, and auxiliary contacts which close momentarily prior to and open shortly after the opening of said main contacts,
arc suppression circuit means responsive to the operation of said auxiliary contacts and connected in parallel with said main contacts for providing a low impedance current path around said main contacts momentarily during opening thereof thereby to suppress arcing, and protection circuit means electrically connected in series with said arc suppression circuit means and operable after the opening of said main relay contacts to isolate electrically said arc suppression circuit after said main contacts have opened completely.

6. The switching circuit of claim 5 wherein said protection circuit means includes a fuse controlled switch including normally closed switch means electrically connected in series with said main relay and fuse circuit means responsive to excessive current flow therethrough and connected to cause said normally closed switch means to open, an auxiliary relay, and means to delay the deenergization of said auxiliary relay until after said main relay contacts have opened, said auxiliary relay including contact means which
a. when said relay is energized, establishes a current path therethrough whereby said arc supression circuit is operable to provide a low impedance current path around said main relay contacts,
b. when said auxiliary relay is deenergized, provides a momentary current path through said fuse circuit means whereby excessive current flowing through said arc suppression circuit will cause said fuse circuit means to open said normally closed switch means and disable said main relay, and
c. thereafter open the circuit through said arc suppression circuit means to prevent any current from flowing therethrough thereby to prevent inadvertent operation of said arc suppression means and to isolate completely the current source from the load.

7. A switching circuit for connecting and disconnecting an alternating current power source to a load including mechanically actuated electrical contacts for carrying current to a load on a continuous basis when closed, first and second series connected triacs electrically connected in parallel with said contacts, a third triac having its main terminals connected to the gate electrodes of said series connected triacs, and switch means electrically connected to the gate electrode of said third triac and means for actuating said switch means with said mechanically actuated contacts for providing gating current to said third triac immediately prior to and during opening and closing of said contacts whereby said third triac provides gating current to said series connected triacs to provide a low impedance current path around said contacts momentarily during opening and closing thereof thereby to suppress arcing.

8. A switching circuit for connecting and disconnecting an alternating current power source to a load including mechanically actuated electrical contacts for carrying current to a load on a continuous basis when closed, first and second series connected triacs electrically connected in parallel with said contacts, first and second switch means electrically connected to the respective gate electrodes of said first and second triacs, and means for actuating said first and second switch means with said mechanically actuated electrical contacts whereby said switch means close immediately prior to and during opening and closing of said contacts to provide gating current to energize said series connected triacs whereby a low impedance current path is provided in parallel with said contacts momentarily during opening and closing thereof thereby to suppress arcing.

* * * * *